(12) United States Patent
Kim

(10) Patent No.: US 6,502,778 B2
(45) Date of Patent: Jan. 7, 2003

(54) ELECTRIC POWER CORD RETRIEVING DEVICE FOR VACUUM CLEANER

(75) Inventor: Gi-Man Kim, Kwangju (KR)

(73) Assignee: Samsung Kwangju Electronics Co., Ltd. (KR)

( * ) Notice: Subject to any disclaimer, the term of this patent is extended or adjusted under 35 U.S.C. 154(b) by 0 days.

(21) Appl. No.: 09/836,262

(22) Filed: Apr. 18, 2001

(65) Prior Publication Data
US 2002/0008172 A1 Jan. 24, 2002

(51) Int. Cl.[7] .............................................. B65H 75/30
(52) U.S. Cl. ................ 242/385.4; 242/385.2; 15/323
(58) Field of Search .................... 242/385.4, 385.1, 242/385.2, 385.3, 396.1, 396.6; 15/323

(56) References Cited

U.S. PATENT DOCUMENTS 2,428,446 A * 10/1947 Beede .................... 242/385.4

* cited by examiner

Primary Examiner—John Q. Nguyen
(74) Attorney, Agent, or Firm—Burns Doane Swecker & Mathis LLP

(57) ABSTRACT

An electric power cord retrieving mechanism for a vacuum cleaner includes a cord reel rotatable in an unwind direction for paying-out a cord, and in a cord wind-up direction for winding up the cord. A brake is normally urged to a reel-engaged position for preventing rotation of the reel in the cord wind-up direction, and is movable to a reel-disengaged position for permitting rotation of the reel in the cord wind-up direction. A cord button is displaceable by a manual force for moving the brake out of the reel-engaged position. A selector button is mounted on the cord button and is movable between a semi-automatic position wherein the brake returns to the reel-engaged position when the manual force is released from the cord button, and an automatic position wherein the brake remains in the reel-engaged position when the manual force is released from the cord button. An automatic releasing member is operable when the selector button is in the automatic position, for automatically releasing the brake for return to the reel-engaged position in response to the cord reaching a fully wound-up state.

7 Claims, 5 Drawing Sheets

ELECTRIC POWER CORD RETRIEVING DEVICE FOR VACUUM CLEANER

This application claims priority under 35 U.S.C. §§ 119 and/or 365 to Patent Application Ser. No. 32511/2000 filed in the Republic of Korea on Jun. 13, 2000, the entire content of which is incorporated herein.

BACKGROUND OF THE INVENTION

1. Field of the Invention

The present invention relates to an electric power cord retrieving device for a vacuum cleaner, and more particularly to an electric power cord retrieving device which can select an automatic or a semi-automatic mode to completely inlet the power cord by pushing once a cord button section in the automatic mode, and to inlet only for the time when the cord button section is pushed by a user in the semi-automatic mode.

2. Description of the Background Art

As shown in FIG. 6, the conventional device of retrieving an electric power cord for a vacuum cleaner for inletting the cord inside of its main body includes a cord reel 20 for folding the electric power cord 21 by means of a rotation of a spiral spring (not shown in the drawing), a brake member 30 operated by an elastic member 31 installed in a predetermined position of a reel cover 50 for controlling the rotation of the cord reel 20 by being attached to the cord reel 20, and a cord button section 40 mounted on the upper part of the main body 10 for selectively releasing by an elastic member 41 to control the rotation of the cord reel 20 by the brake member 30.

Accordingly, the electric power cord 21 wound on the cord reel 20 is released by pulling the cord in the state of FIG. 6. When the cord button section 40 is pushed against the elastic force of the elastic member 41, the brake member 30 is pivoted at the center of a hinge point against the elastic force thereof, and pressurized force on the cord reel 20 is released.

The cord reel 20 winds the electric power cord 21 with the rotation by rotation-retrieving force of the spiral spring.

When the pressure on the cord button section 40 is removed in the state of rotation of the cord reel 20, the brake member 30 is pressurized again on the cord reel 20 to control the rotation of the cord reel 20.

However, the device of retrieving the electric power cord described poses a problem of continuously pushing the cord button section for completely inletting the electric power cord.

SUMMARY OF THE INVENTION

To resolve the above problems, it is an object of the present invention to select an automatic or semi-automatic mode for a device of retrieving an electric power cord for a vacuum cleaner when inletting the cord inside the main body thereof. Thus, the electric power cord is completely inlet by pushing once a cord button section in the automatic mode, while the cord is inlet only for the time when the cord button section is pushed by a user in the semi-automatic mode.

BRIEF EXPLANATION OF THE DRAWINGS

The above objectives and advantages will become more apparent with explanation of the accompanying drawings.

DETAILED DESCRIPTION OF THE INVENTION

To achieve the above objects, an electric power cord retrieving device for a vacuum cleaner according to the present invention, characterized in that a cord reel selectively winds an electric power cord by a brake member pivoted by controlling a cord button section, comprises: an automatic/semi-automatic button mounted on the cord button section for selecting the winding of the cord reel as the automatic or semi-automatic mode; a hinge pin installed in the reel cover; and an automatic releasing member installed so as to be rotatable and closely adjacent to a rotation control projection protruded at a predetermined position of the reel cover by means of an elastic member such as a torsion spring inserted to the hinge pin.

The constitution and operation of an embodiment of the present invention will now be explained in detail with reference to the accompanying drawings.

Figure 1:
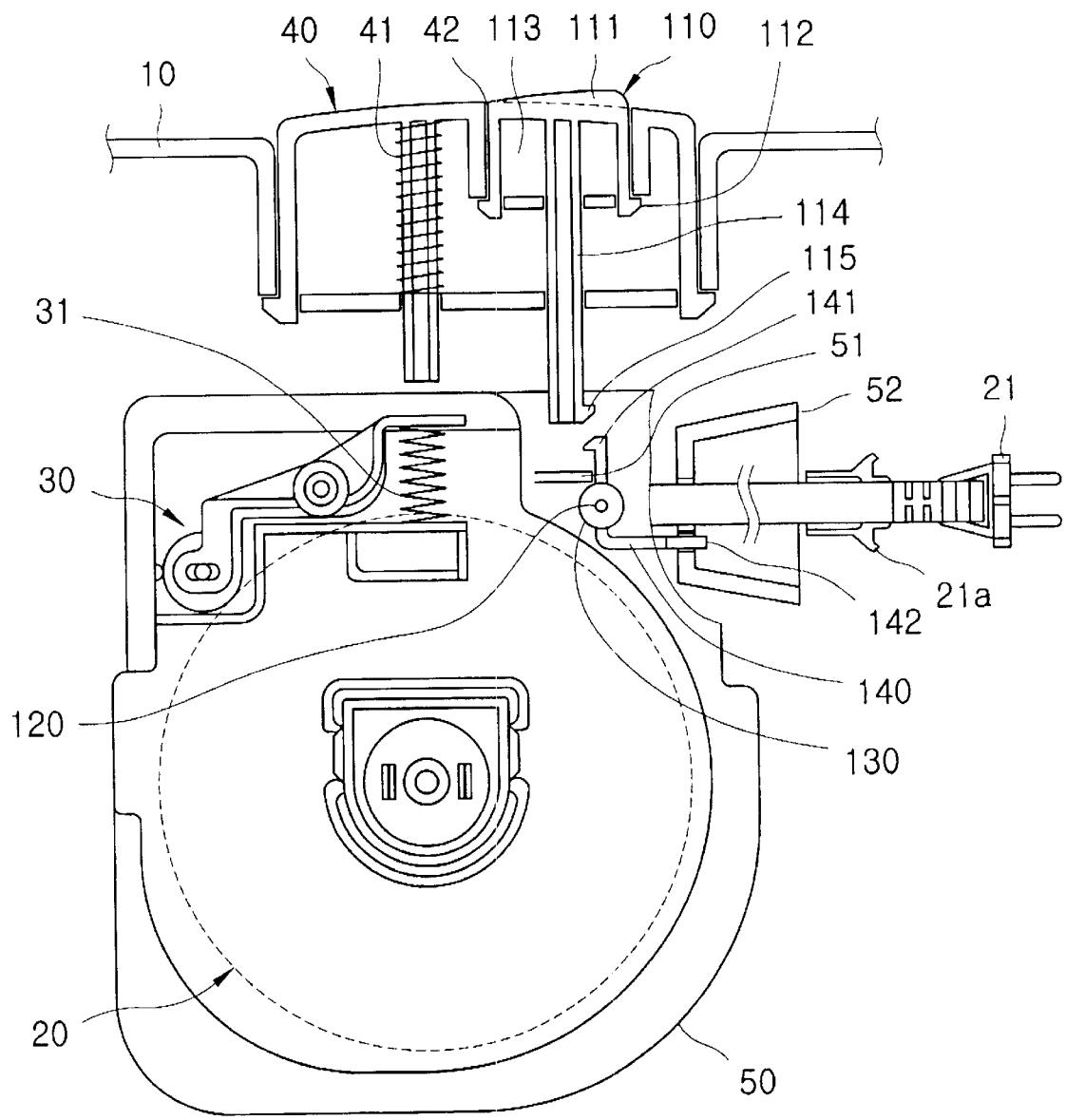
FIG. 1 is a schematic view showing an electric power cord retrieving device for a vacuum cleaner according to the present invention.
Figure 2:
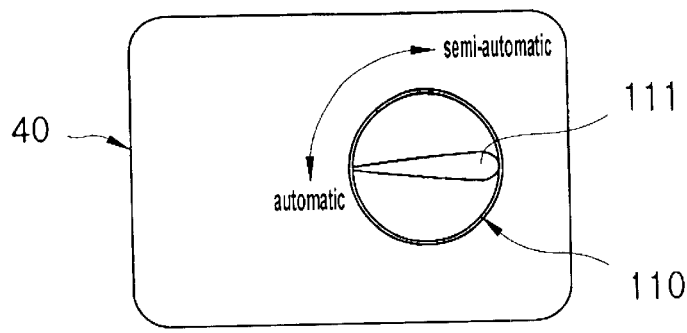
FIG. 2 is a top-plan view of a main system illustrating an area, on which an automatic or semi-automatic button is mounted according to the present invention.
Figure 3:
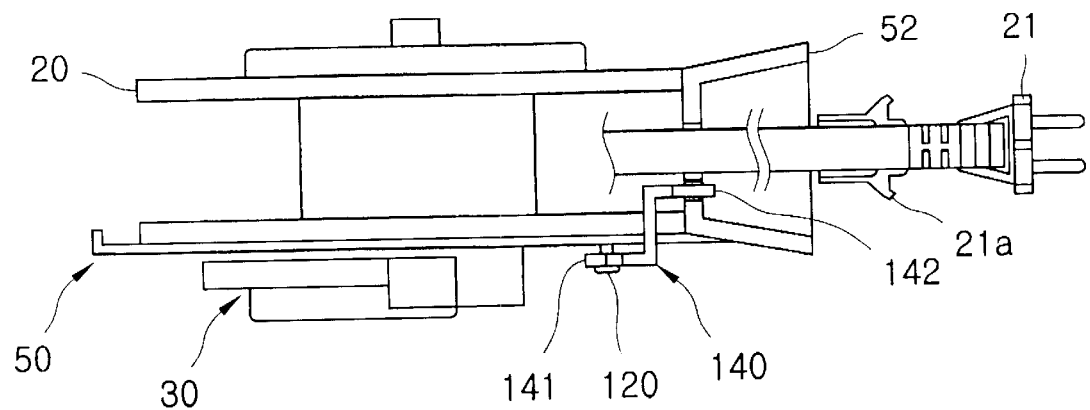
FIG. 3 is top-plan view showing a cord reel of the electric power cord retrieving device for a vacuum cleaner according to the present invention.

FIG. 1 is a schematic view showing the electric power cord retrieving device for a vacuum cleaner according to the present invention. FIG. 2 is a top-plan view of a main system illustrating an area, on which an automatic or semi-automatic button is mounted according to the present invention. FIG. 3 is a top-plan view showing a cord reel of the device of retrieving an electric power cord for a vacuum cleaner according to the present invention. The explanation on the parts identical to the prior art will be omitted here by leaving the same drawing reference numerals.

The cord reel 20 selectively winds the electric power cord 21 by means of the brake member 30 pivoted by the cord button section 40 in the device of retrieving an electric power cord for a vacuum cleaner. When operating the automatic/semi-automatic button 110 mounted on the cord button section 40 pressurizes the cord button section 40, the automatic releasing member 140 is pivoted so as to be elastically supported by the hinge pin 120 and the elastic member 130 and to selectively control rising of the cord button section 40.

To be specific, the automatic/semi-automatic button 110 is mounted on the cord button section 40 and is selected by rotating the winding of the cord reel 20 automatically or semi-automatically.

The automatic releasing member 140 is supported by the rotation control projection 51 protruded at a predetermined position of the reel cover 50 by means of the elastic member 130 such as a torsion spring inserted to the hinge pin 120. When cord button section 40 is pushed in case the automatic/semi-automatic button 110 is in an automatic mode, the lower part of the automatic/semi-automatic button 110 is controlled and pressurized so as not to rise.

When the entire cord 21 is inlet by rotation of the cord reel 20, the automatic releasing member 140 is rotated a predetermined angle by the releasing hanger member 21a positioned at a lower part of the power cord 21, and raise the cord button section 40 and the automatic/semi-automatic button 110 to release the cord button section 40 and the automatic/semi-automatic button 110.

Here, the automatic/semi-automatic button 110 comprises a position displayer 111 mounted on the most upper part for displaying the position; a button assembling section 112 inserted to the automatic/semi-automatic button installation section 42 that is formed at a predetermined position of the cord button section 40 by being coupled with the position displayer 111 for rotation; a plurality of ribs 113 mounted inside of the button assembling section at a predetermined angle for preventing movement of the button assembling section 112 toward an axial direction; an elongation section 114 elongated to the center of the ribs 113; and a hook projection 115 protruded with a predetermined width at a lower part of the elongation section 114 to be hooked with the automatic releasing member 140.

The automatic releasing member 140 includes a control projection 141 coupled with the hook projection 115 of the automatic/semi-automatic 110 and a releasing contact section 142, the other end of which is allocated at an inletting entrance 52 of the reel cover 50.

Figure 4:
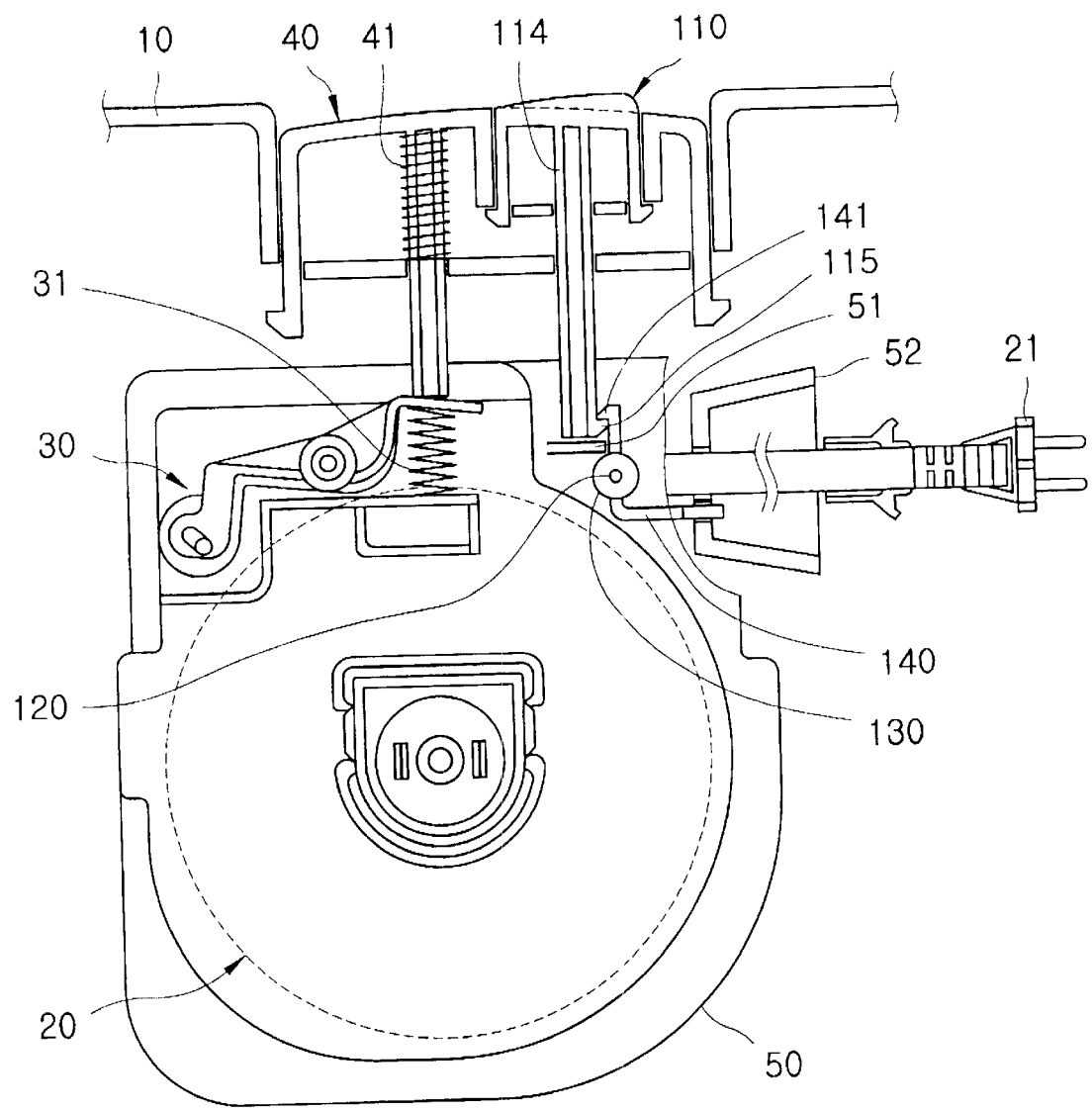
FIG. 4 is an explanatory view illustrating a state of the automatic mode in the electric power cord retrieving device for a vacuum cleaner according to the present invention.

Accordingly, the electric power cord wound on the cord reel 20 is released by pulling the electric power cord 21 in the state of FIG. 4. The cord button section 40 is pushed against the elastic force of the elastic member 41, the brake member 30 is pivoted on the center of a hinge point against the elastic force, and the pressurized force on the cord reel 20 is released.

Meanwhile, the cord reel 20 winds the electric power cord 21 with the rotation by the rotation-retrieving force of the spiral spring.

If the pressurized force on the cord button section 40 is eliminated while the cord reel 20 is rotating, the hook projection 115 of the automatic/semi-automatic button 110 is caught in the control projection of the automatic releasing member 140 and cannot restrain rising of the cord button section 40 due to a continuous rotation of the cord reel 20 for winding the electric power cord 21.

If a releasing hanger member 21a mounted on the electric power cord 21 gives an impulse to the releasing contact section 142 of the automatic releasing member 140 while being wound on the cord reel 20, the automatic releasing member 140 is pivoted at the center of the hinge pin 120 at a predetermined angle against the elastic force of the elastic member 130. The hook projection 115 of the automatic/semi-automatic button 110 is separated from the control projection 141 and the automatic/semi-automatic button 110 rises with the cord button section 40 by the rising of the elastic member 41. Simultaneously, the brake member 30 pressurizes the cord reel again by the elastic member 31.

Figure 5:
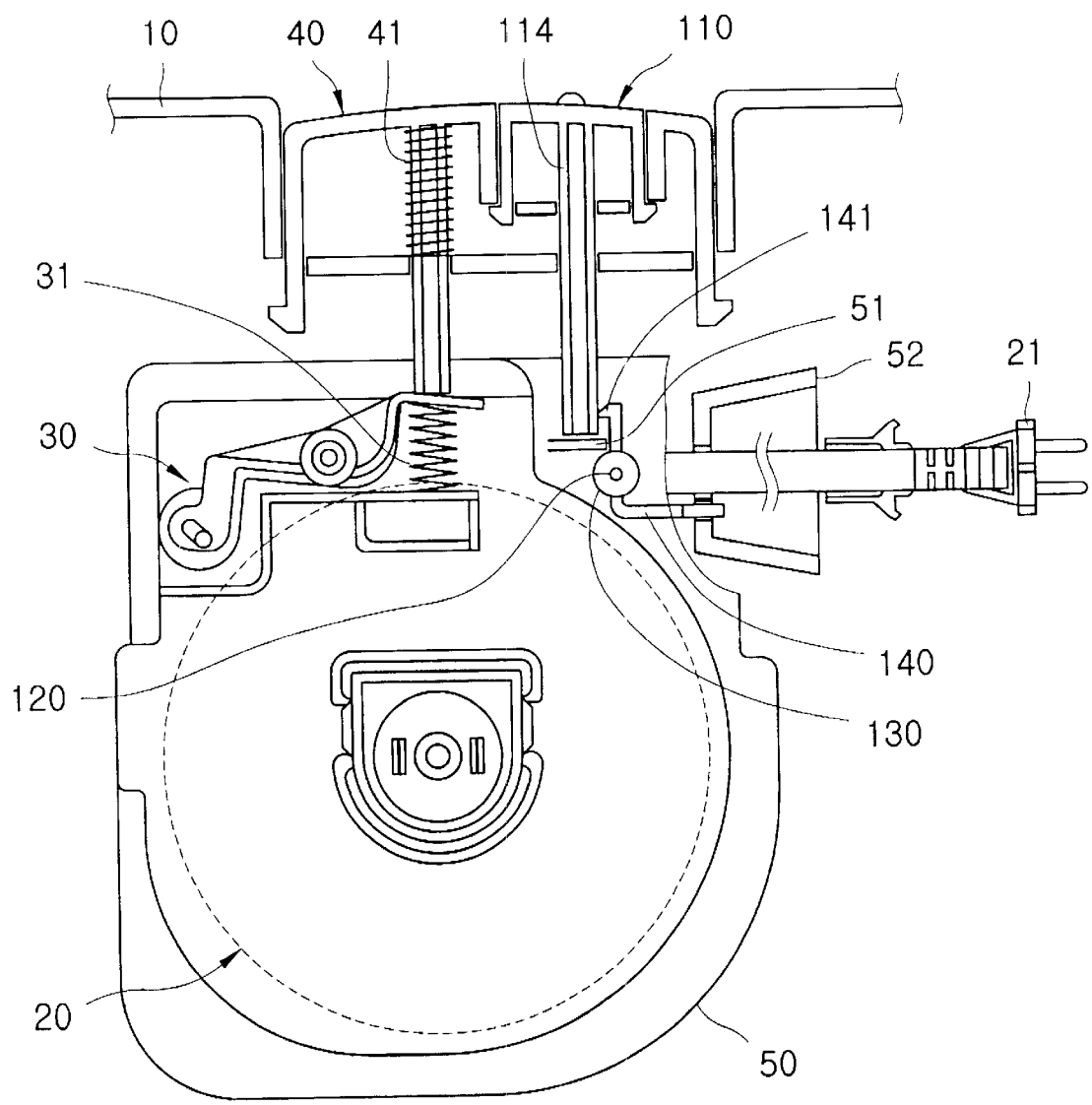
FIG. 5 is an explanatory view illustrating a state of the semi-automatic mode in the electric power cord retrieving device for a vacuum cleaner according to the present invention.
Figure 6:
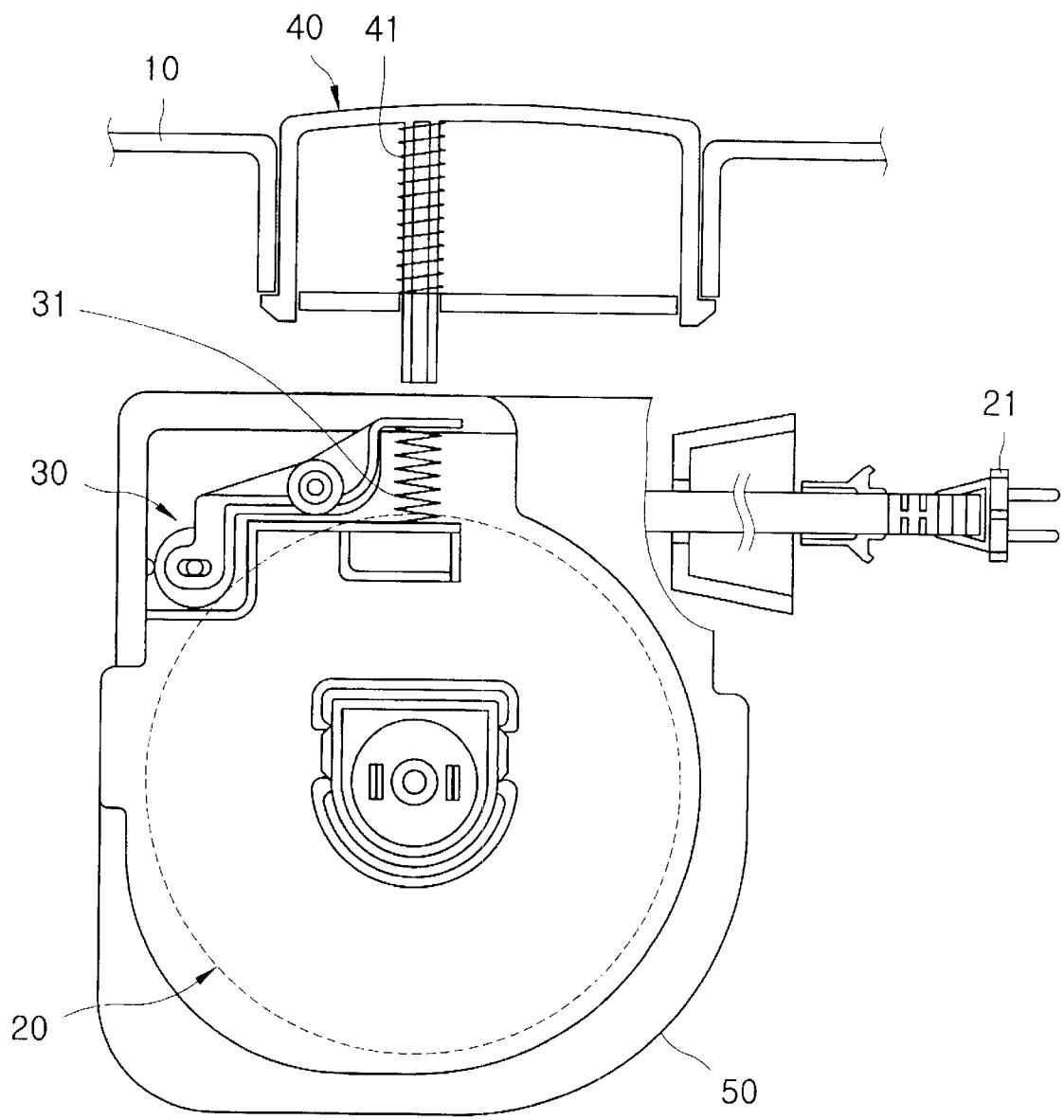
FIG. 6 is a cross-sectional view showing a conventional device of retrieving an electric power cord for a vacuum cleaner.

While the cord button section 40 is pushed against the elastic force of the elastic member 41 in the semi-automatic mode as shown in FIG. 5 illustrating a released state of the electric power cord wound on the cord reel by pulling the cord 21, the brake member 30 is pivoted at the center of the hinge point against the elastic force of the elastic member 31, and releases the pressurized force on the cord reel 20. Then, the cord reel 20 winds the electric power cord 21 with the rotation-retrieving force of a spiral spring.

Meanwhile, the pressurized force on the cord button section 40 is eliminated while the cord reel 20 is rotating. Then, the hook projection 115 of the automatic/semi-automatic button is unhooked with the automatic releasing member 140, and the rising of the cord button section 40 cannot be controlled. Thus, the electric power cord 21 maintains a projected length because the brake member 30 is not rotated due to a close attachment to the cord reel 20.

Simultaneously, the brake member 30 pressurizes the cord reel 20 again by the elastic member 31.

As described above, the electric power cord according to the present invention is completely inlet by pushing once a cord button section in the automatic mode while the power supply code section is inlet only for the time when the cord button section is pushed by a user in the semi-automatic mode.

While the present invention has been described herein with reference to particular embodiments thereof, a latitude of modification, various changes and substitutions are intended in the foregoing disclosure. And in some instances, some features of the invention will be employed without a corresponding use of other features without departing from the spirit of the invention as set forth herein.

What is claimed is:

1. An electric power cord retrieving mechanism for a vacuum cleaner, comprising:

a cord reel rotatable in an unwind direction for paying-out a cord, and in a cord wind-up direction for winding up the cord;

a brake normally urged to a reel-engaged position for preventing rotation of the reel in the cord wind-up direction, and movable to a reel-disengaged position for permitting rotation of the reel in the cord wind-up direction;

a cord button displaceable by a manual force for moving the brake out of the reel-engaged position, a selector button mounted on the cord button and movable between a semi- automatic position wherein the brake returns to the reel-engaged position when the manual force is released from the cord button, and an automatic position wherein the brake remains in the reel-disengaged position when the manual force is released from the cord button; and an automatic releasing member operable when the selector button is in the automatic position, for automatically releasing the brake for return to the reel- engaged position in response to the cord reaching a fully wound-up state.

2. The mechanism according to claim 1 wherein the selector button includes a hook projection, and the automatic releasing member includes a control projection engageable with the hook projection when the selector button is in the automatic position and the cord button has been displaced, for retaining the brake in the reel-disengaged position.

3. The mechanism according to claim 2 wherein the automatic releasing member includes a releasing contact section arranged to be contacted by a releasing hanger member affixed to the cord in response to the cord reaching a fully wound-up state, for disengaging the control projection from the hook projection.

4. The mechanism according to claim 3 wherein the automatic releasing member is mounted for rotation about an axis, the control projection disposed on one side of the axis, and the releasing contact section disposed on an opposite side of the axis.

5. The mechanism according to claim 4 further including a spring arranged for biasing the automatic releasing member in a direction for maintaining engagement between the hook projection and the control projection, the spring being yieldable in response to the releasing contact section being contacted by the releasing hanger member.

6. The mechanism according to claim 5 wherein the selector button is rotatable relative to the cord button for movement between the semi-automatic position and the automatic position.

7. The mechanism according to claim 1 wherein the brake is spring-biased to the reel-engaged position.

* * * * *